United States Patent Office 3,610,041
Patented Oct. 5, 1971

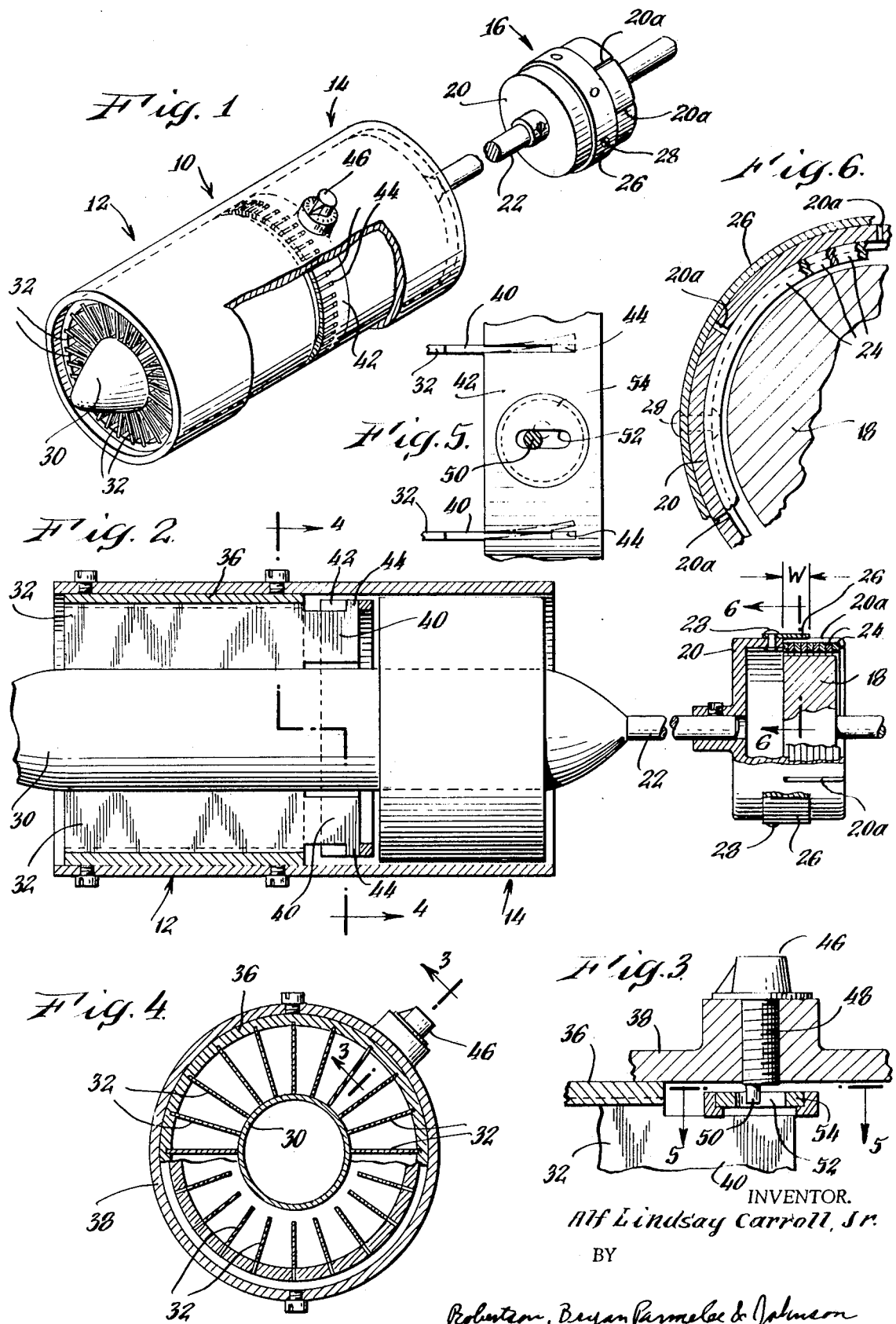

3,610,041
CRYOGENIC MASS FLOWMETER
Alf Lindsay Carroll, Jr., Saugus, Calif., assignor to
The Foxboro Company, Foxboro, Mass.
Filed Dec. 3, 1969, Ser. No. 881,689
Int. Cl. G01b 1/00
U.S. Cl. 73—194 E
9 Claims

ABSTRACT OF THE DISCLOSURE

A mass flowmeter of the angular momentum type having a flow straightener assembly consisting of a plurality of straightening vanes arranged raidally about a supporting hub, with the trailing edges of the vanes coupled to an adjusting ring which is rotatable to displace circumferentially the trailing edges so as to bend the downstream portions of the vane and thereby alter correspondingly the flow pattern of the fluid to obtain zero angular momentum. The flowmeter includes a rotor driven by a constant-torque hysteresis clutch the magnetic material of which is placed under a carefully controlled temperature-responsive stress to minimize changes in clutch torque with variations in temperature.

---

This invention relates to angular momentum flowmeters such as are used to measure mass flow rate. More particularly, this invention relates to means for improving the performance and operability of such flowmeters.

An angular momentum type flowmeter basically comprises a tubular flow conduit containing at least one axial rotor carrying blades to engage the fluid passing through the conduit. In one successful flowmeter arrangement, as shown in U.S. Pat. No. 3,089,366, the mass flow rate is measured by means of a single rotor having straight blades and driven with a constant torque through a hysteresis clutch.

The operation of the flowmeter is based on a relationship wherein mass flow rate is directly proportional to torque and inversely proportional to the angular velocity imparted to the fluid by the rotor blades. This is represented by the equation $Q = T/\omega$ where Q is the mass flow rate of the fluid, T is the torque applied to the rotor of the flowmeter and $\omega$ is the angular velocity of the fluid. With a constant torque applied to the turbine rotor, the mass flow rate will be proportional to $1/\omega$, so that measuring the rotational velocity of the turbine will provide a determination of mass flow rate.

The torque developed by a hysteresis clutch, such as described in the above-mentioned U.S. Pat. No. 3,089,366, is nominally constant, but experience has indicated that the torque actually does change a small amount with changes in temperature. This is particularly the case at the very low temperatures encountered in cryogenic applications. The change in torque evidently is the result of changes in the magnetic properties of the components. In accordance with one aspect of the present invention, such changes in torque are minimized by a technique of applying a carefully controlled temperature-responsive stress, thereby straining said material and strain to the magnetic material, so as to compensate for the normal variations in magnetic characteristics, and thereby develop an effectively constant torque for the rotor of the flowmeter.

To measure the mass flow rate accurately, the fluid must have zero angular momentum when it reaches the rotating turbine. Conventional flowmeters typically include a flow straightener assembly intended to eliminate angular momentum in the fluid prior to its contact with the rotor blades. Such straightener assembly ordinarily comprises a series of radially-disposed "vanes" positioned about a central hub in the flow conduit just ahead of the rotor.

It has been found that as the fluid velocity increases, particularly at the higher flow ranges, an unwanted increment of angular momentum is imparted to the fluid from minor variations or non-uniformities in the internal structure of the meter, e.g. straightener vane alignment or rotor straightness, and also from trailing edge effects. Such unwanted increment of angular momentum results in non-linear performance of the meter, with a resultant error in the indicated mass flow.

The present invention provides an improved straightener assembly for a flowmeter wherein any torque or angular momentum that is imparted to the entering fluid by such minor variations in the meter construction can readily be eliminated by a simple adjustment. This adjustment advantageously can be made from outside the meter casing, with the flowmeter installed and in operation. It thus permits zero trimming to be done quickly and accurately without the necessity of removing the meter from its installation.

In a presently preferred meter construction to be described hereinbelow in detail, the vanes of the flow straightener assembly are formed with flexible downstream sections the trailing ends of which can be displaced in unison circumferentially by an adjusting ring. Such displacement alters in a precisely controllable fashion the axial alignment between the flexible sections and the direction of fluid flow, so as to introduce a corresponding twist in the fluid flow pattern, and thereby providing an adjustable compensation for any structural misalignment or the like, giving rise to an unwanted increment of angular momentum.

Accordingly, it is a general object of this invention to provide improved flowmeter apparatus of the angular momentum type. A specific object of this invention is to provide such apparatus capable of accurate measurements throughout a wide range of operating conditions, including changes in temperature of the meter components. A more specific object is to provide means for adjusting the trim of a flowmeter strightener vane assembly while the flowmeter is in operation. Other objects, aspects and advantages of the invention will be pointed out in, or apparent from, the following description of a preferred embodiment of the invention, considered together with the accompanying drawings in which:

FIG. 1 shows a perspective view of the functional components of the mass flowmeter;

FIG. 2 shows a partial sectional view of the flow straightening assembly of the mass flowmeter of FIG. 1;

FIG. 3 is a section showing the eccentric screw arrangement for rotating the adjusting ring;

FIG. 4 is a sectional view of the straightener assembly taken along the line 4—4 in FIG. 2;

FIG. 5 is a sectional view of the drive screw arrangement taken along the line 5—5 in FIG. 3; and FIG. 6 is a partial sectional view of the hysteresis clutch assembly taken along the line 6—6 in FIG. 2.

Referring now to FIG. 1, fluid enters the flowmeter 10 in the direction of the arrow and passes through a flow straightener assembly 12 wherein any angular momentum of the fluid is to be eliminated. Thereafter, the fluid passes to the turbine rotor assembly 14. Constant torque is applied to this rotor assembly by means of a hysteresis drive clutch 16 of known basic construction, e.g. as shown in the above-mentioned U.S. Pat. 3,089,366.

This hysteresis drive clutch, more clearly shown in FIGS. 2 and 6, comprises a rotating permanent magnet disc 18 which exerts a constant drag torque on a clutch cup 20. This torque is transmitted from the cup via a shaft 22 to the turbine rotor 14. The torque imparted to the turbine rotor is constant over a wide range of rotational speeds of the rotor.

The clutch cup 20 is formed internally to receive and hold a series of stacked rings 24 of magnetic material, e.g. the material referred to as Vicalloy. The rotating magnet disc 18 preferably is made of Alnico V or comparable material. The rotating field developed by this magnet passes through the rings 24 and exerts thereon a corresponding drag torque of substantially constant magnitude tending to rotate these rings.

When using a conventional hysteresis clutch construction, it will be found that the torque will change at very low temperatures, and thereby cause a corresponding error in the meter reading. The present invention avoids such errors by an arrangement which compensates for the changes in magnetic characteristics of the clutch elements. The technique used is to introduce into the magnetic material of the rings a precisely-predetermined amount of compressive strain which varies controllably with changes in temperature.

This result is effected in the disclosed embodiment by the use of a so-called strain hoop 26 which is secured to the outer surface of the cup 20, as by means of a pin 28 or the like. The cup is slotted at six evenly-spaced points 21 to remove or reduce its hoop strength in the region adjacent the rings 24. The strain hoop may, for example, be made of 300 series stainless steel, having a thermal coefficient greater than that of Vicalloy used in the magnetic rings. Thus as the temperature is lowered, a compressive stress, thereby straining said material and (magnetostriction) is applied by the hoop to the magnetic rings. By carefully selecting controllable parameters of the strain hoop, the temperature sensitivity of the basic components can be essentially compensated for, and its effects made negligible. One such controllable parameter is the axial length W of the part of the strain hoop which overlaps the magnetic rings. Thus, by experimentally fixing this length, it is possible to provide the desired compensation.

Although the compensation technique has been illustrated herein through the use of a strain hoop, the technique can be carried out in other ways. For example, it has been found that by very careful control of the fit between the rings 24 and the cup 20, and by controlling the hoop strength of the cup (as by the use of four evenly-spaced axial slots 21 of selected length), the compressive stress, thereby straining said material and applied by the cup itself to the magnetic rings can be adjusted to precisely the proper value to effect the desired compensation, thus eliminating the need for the outer strain hoop 26. The cup material will have a greater thermal coefficient than the magnetic rings so as to produce an increasing compressive strain with decreasing temperature.

Referring now to the fluid as it approaches the rotor 14, it has been found that conventional flow straightener assemblies do not satisfactorily eliminate unwanted angular momentum in the fluid passing through the turbine rotor. Thus, as the flow rate increases, there are changes in angular momentum due, for example, to minor variations in the flow straightener vane alignment, rotor straightness and trailing edge effects. Such changes tend to introduce non-linearities making accurate meter readings difficult. The present flowmeter construction incorporates a superior means of avoiding such error-producing effects.

In more detail, it can be seen from FIGS. 2 and 4 that from center hub 30 extends a plurality of thin metal straightening vanes 32, symmetrically arranged about the axis of the hub. The outer edges of the upstream sections 34 of these vanes are secured to the inner surface of a shroud 36 which is in turn secured to the meter housing 38.

The outer edges of the downstream sections 40 of the vanes 32 are relieved, i.e. cut back a small amount, so that these sections are free from engagement with the shroud 36. Thus the downstream sections may be displaced a small amount circumferentially about their neutral position. To effect such displacement, an adjusting ring 42 is provided around the straightening vanes. This adjusting ring is formed with slots adapted to receive and engage end tabs 44 at the trailing edges of the vanes.

The adjusting ring 42 can be rotated about the longitudinal axis of the flowmeter by an adjustment means which in the disclosed embodiment comprises an eccentric drive. The adjustment means are shown in FIGS. 3 and 5. The arrangement shown includes a selector knob 46 located outside of the meter housing 38, and which is connected to a screw 48 held in any set position by a conventional thread locking device (not shown). This screw has mounted on its end a drive pin 50 the axis of which is slightly offset (e.g. .030") from the screw axis. Pin 50 engages an elongate slot 52 in an insert disc 54 in the adjusting ring.

By rotating the selector knob 46 either clockwise or counterclockwise, the pin 50 will be moved laterally because of its eccentric mounting on screw 48. The longitudinal component of pin motion is accommodated by the elongate slot 52, while the circumferential component of its motion causes the ring to rotate a small amount about the meter axis, e.g. less than .020" for one-quarter turn of the knob.

The resulting rotation of the ring 42 shifts the tabs 44 circumferentially, and thereby bends slightly the downstream sections 40 shown in FIG. 5 into a curved configuration (but remaining within the elastic limit of the material). This curved configuration introduces a slight twist into the fluid flow pattern, i.e. it imparts a corresponding angular momentum to the fluid. The amount of such twist can be adjusted with precision to a value compensating for (i.e. counteracting) the unwanted component of angular momentum referred to hereinabove.

The trimming adjustment may be made by first de-energizing the motor drive to the hysteresis clutch 16, so that the rotor blades (being straight) will tend to come to a rest position. Any rotation of the rotor which then occurs will be due to an undesired component of angular momentum introduced by non-uniformities, assymetries, or other uncontrollable characteristics of the meter construction. To compensate for these effects, the selector knob 46 is rotated until the meter output shows that the rotor has come to rest. At that point, the instrument is properly zeroed for operation.

This arrangement has the advantage that the adjustments can be made with the flowmeter installed and in operation. This permits trimming to be done quickly and easily without the necessity of removal of the meter from its installation.

Although not shown herein, the meter is provided with known means for sensing the rate of rotor rotation, as by means of magnetic detecting means located outside the meter casing adjacent the rotor blades. It will be apparent that various modifications can be made in the disclosed apparatus without departing from the spirit and scope of the invention.

What is claimed is:

1. In an angular momentum flowmeter of the type including a rotor driven through a hysteresis clutch to apply a constant torque to the rotor, and wherein the clutch comprises magnetic material including a magnet and cooperating material mounted for relative rotation, and wherein the magnetic properties of at least a portion of said material change with variations in temperature in such a manner as to correspondingly alter the magnetization of said cooperating material and thereby vary the torque, the improvement to said clutch to avoid errors resulting from changes in temperature which comprises means to apply to the magnetic material a temperature-responsive stress, thereby straining said material and producing magnetostriction effects which vary with said temperature in a controlled pre-selected manner to prevent said variations in torque which otherwise would result from said changes in said magnetic properties due to temperature changes.

2. Apparatus as claimed in claim 1, wherein said clutch comprises an internal rotatable magnet surrounded by a ring of magnetic material; said stress applying means being arranged to apply a compressive stress to said ring of magnetic material.

3. Apparatus as claimed in claim 2, wherein said compressive stress is applied by a cup carrying said magnetic material in its interior surface.

4. Apparatus as claimed in claim 3, wherein said cup is made of material having a greater thermal coefficient of expansion than said magnetic material of said ring.

5. Apparatus as claimed in claim 4, wherein said cup is slotted to reduce its hoop strength.

6. Apparatus as claimed in claim 3, including a strain hoop secured to the outer surface of said cup, said strain hoop being made of a material having a thermal coefficient of expansion greater than the magnetic material of said ring.

7. The method of operating an angular momentum type of flowmeter wherein a rotor in the flowing fluid stream is driven with constant torque through a hysteresis clutch having magnetic material comprising a magnet element mounted for relative rotation with respect to a second element and wherein the magnetic field of said magnet element magnetizes said second element, one of said elements being adapted to be driven so that the relative motion of the magnetic field applies a torque to the other element in accordance with the degree of said magnetization, the magnetic properties of at least a portion of said magnetic material varying with the temperature thereof in such a fashion that with said magnetic material in unrestrained condition the magnetization of said second element normally would vary with temperature so as to alter said applied torque with temperature, the method comprising applying a temperature responsive stress to one of said elements so as to strain said element and thereby produce a magnetostrictive effect of predetermined magnitude just sufficient to counteract said normal variations in magnetization and thereby maintain a constant magnetization and consequent constant torque with such changes in temperature.

8. The method of claim 7, wherein the compressive stress is applied to the magnetic material.

9. The method of claim 8, wherein the compressive stress is applied by a third element positioned around said magnetic material and having a different thermal coefficient of expansion.

References Cited

UNITED STATES PATENTS

| | | | |
|---|---|---|---|
| 1,029,880 | 6/1912 | Menns | 73—497 |
| 1,626,681 | 5/1927 | McGahan | 73—497 |
| 1,672,189 | 6/1928 | Zubaty | 310—97 |
| 2,857,761 | 10/1958 | Bodge | 73—194 |
| 3,089,336 | 5/1963 | Waugh et al. | 73—194 |
| 3,144,573 | 8/1964 | Bergey et al. | 310—94 |

RICHARD C. QUEISSER, Primary Examiner

JOHN WHALEN, Assistant Examiner

U.S. Cl. X.R.

73—231 M